Patented July 24, 1934

1,967,333

UNITED STATES PATENT OFFICE 1,967,333

BEDDING FOR POULTRY AND ANIMALS AND METHOD OF PREPARING SAME

William F. Smith, Weston, Mass., assignor to Elwyn C. Thayer, Waltham, Mass.

No Drawing. Application January 6, 1934, Serial No. 705,571

5 Claims. (Cl. 119—1)

The subject of this invention is an improved bedding material for poultry and animals, and the method of preparing the bedding material.

Heretofore, various materials have been used as bedding for poultry and animals, including principally wood shavings, straw, peat moss, and sawdust. These materials have certain disadvantages, which not only impair them for their primary use, but which detract from the fertilizing use to which they are put after they have become associated with the poultry or animal excrement. Thus, wood shavings are of comparatively low absorbency and when used as a bedding, as for poultry, it does not absorb well the liquid, semi-solid, and solid components which may constitute the guano. As a result, much of the fertilizer is disassociated or loose, rather than being incorporated throughout and retained in the bedding. Aside from this fact, wood chips or shavings tend to induce an acid character in the soil, so that when this material containing the valuable guano is employed as a fertilizer, considerable lime must be used therewith in order to correct or neutralize the objectionable acid condition which would otherwise be imparted to the soil. The use of straw is accompanied by the disadvantage that this material, too, is lacking in much absorbency and is comparatively expensive. Moreover, even when distributed uniformly to begin with, it tends to become displaced under the activity of poultry or animals, on account of its long strands and their entangled condition. Peat moss is characterized by high absorbency, but it presents the drawback of comparatively dark color and dustiness. This latter fault is a serious one, especially in the case of a poultry bedding, for it has been established that many of the ailments of poultry, such as infectious bronchitis and generally impaired nasal conditions, are attributable to the inhalation of dust by the poultry. Again, dark coloring matter is leached out from the moss when it becomes wet, and tends to stain eggs, and to discolor poultry or the hides of cattle. Sawdust is not only dry, but, like wood shavings, is objectionable as a fertilizer constituent.

In accordance with the present invention, I produce an advantageous bedding material for poultry and animals, by using so-called bagasse as raw material. Aside from the fact that bagasse is available in large quantities as a waste material at sugar plantations, it lends itself through proper conditioning, to conversion into a bedding which is substantially free from dust, and has high absorbency, light color, and valuable soil-nutritive properties. Indeed, bagaasse has some fixed nitrogen, potash and silicious matter, and, what is more important, quickly decomposes in the soil to furnish humus, without generating an undesirable condition of acidity. In conditioning the bagasse, i. e., the crushed and extracted sugar-cane, for use as the bedding material, my proceedure is substantially as follows. The crushed and extracted stalks as available at the sugar plantation are initially subjected to a drying operation, for instance an air-drying operation, which transforms the stalk fragments into a more or less crumbly and readily disintegrable mass. At this stage, however, there is a likelihood that fragments have become stuck together into pieces of comparatively large size, characterized by a harsh feel and a tendency to release dust upon disintegration. The drying operation is preferably performed at sufficiently elevated temperature to render the bagasse sterile, that is, to kill such insects, fungi, bacteria, spores, etc., which are naturally and inevitably associated with bagasse. Sterilization not only prevents the spread of poultry, animal, plant, or other diseases that may come from unsterilized bagasse, but keeps the finished bedding material of the present invention from spoiling on account of mold or other bacterioligical changes therein. The high temperature drying operation may be performed by introducing the bagasse into a drying chamber through which air or other gas at sufficiently elevated temperature to effect the desired sterilization is passed. The heated, drying and sterilizing gas may advantageously be flue gas which is preferably at a temperature of about 250° to 400° F. so as to ensure complete sterilization. Flue gas at such temperature is available from the boiler furnaces always forming part of the equipment of a sugar mill or so-called sugar centrale. The drying and sterilizing operation may be performed by bringing the bagasse in contact with such heated gas either in parallel flow therewith or in countercurrent flow thereto and should be carried on until preferably not more than about 10% moisture based on the bone-dry weight of the bagasse is present in the dried mass.

The dried mass is next subjected to a suitable disintegrating or comminuting operation, preferably in a hammer mill equipped at its discharge or exit end with a grating or screen which permits the passage therethrough of fibers not greater than a predetermined maximum length. Not only does the hammer mill disintegrate the large pieces, but breaks up the fragments into a bulky mass of individual fibers and releases, as a dust, the pith. The hammer mill can be, and should be, adjusted to produce comparatively few fibers of less than about one inch in length, as the qualities desired in my bedding are realized only when it is made up of fibers whose length ranges from about one to four inches. The average fiber length most suitable for poultry bedding is about 1 to 3 inches, as such fiber length makes it impossible for most poultry to devour the fibers and suffer on this account from so-called "impaction" and digestive disorders. On the other hand, bedding material such as to be used for horses, cows, dogs, or other such animals, may be of an average fiber length ranging from about 1 to 4 inches, as bagasse fibers are distasteful to such animals. As already indicated, the fiber length can be and is controlled by the size of the screen openings at the discharge or exit end of the hammer mill. The mass discharged from the hammer mill thus consists of a fluffy mass of fibers, contaminated by pith and other dust, which, as already indicated, is objectionable in a bedding. The dry, bulky mass is therefore subjected to suitable dusting, as by introduction into an apparatus which furnishes a current of air to blow the dust particles from the mass into a suitable recovery chamber. The dust so collected constitutes a valuable by-product, being serviceable, for example, as a filler in the rubber and other industries. The dust-free mass of dry bulky fibers can be used directly as a bedding. It is loose and so lends itself to easy and uniform distribution over the floor of a hen house or dairy barn. Because of its high porosity and absorbency, it absorbs and entrains liquid, semi-solid, and solid animal excrement uniformly and with little, if any, loss of the uric acid or other valuable fertilizing element. It is characterized by springiness or resiliency and little tendency for its fibers to aggregate or clump, even in the presence of moisture, on account of their coarseness. The fibers are not, however, of such length that they become entangled or knotted so as to make uniform spreading of the mass difficult. The mass can be packaged conveniently, as in the form of bales, for storage and shipment.

In some instances, it may be advantageous to incorporate into the finished bedding material a comparatively small percentage, say, about 1% to 3% of suitable antisepticizing agents, for instance, essential oils of the nature of oil of eucalyptus, which are nonpoisonous and which do not cause nutritional disturbances particularly in the case of poultry, which, as already indicated, have a tendency to swallow the bedding fibers. Such agents tend to keep the bedding material from becoming moldy or becoming a favorable environment for the bacteria or the putrefactive organisms associated with the poultry or animal excrement deposited on the bedding material.

I have already adverted to the fact that the finished bedding material of the present invention is characterized by its substantial freedom from pith or other dust. In this connection, I wish to point out that although most of the pith occurs at the center of sugar cane, yet some exists in the outer wall or fibrous portion of the cane. It is possible to rid the bagasse not only of the center pith by the use of a disintegrating machine which effects impact action thereupon, but also of most of the pith locked in its wall or fibrous portion. By the expression "substantial freedom from pith", I mean the removal of 75% or more of the pith content of the cane, preferably about 90% or more, as such latter percentage removal ensures a substantial dustless product. Hammer mills or other impact disintegrators are preferred for doing the work of comminuting or breaking up the dried bagasse, as they are especially effective in liberating or releasing substantially all of the pith in a form easily segregated by air blast from the fibers which are to constitute the bedding material of the present invention. Other suitable disintegrating machines, for instance, machines which pick or tease out fibers of suitable length from the dried bagasse and operate on the same general principles as the pickers or cards of the textile industry may be employed. In such case, too, the fibers should be classified or graded as by a screening operation to produce a mass of the desired fiber length and the mass should be freed from pith and other dust in order to constitute a finished product answering the purposes of the present invention.

It is to be observed that my raw material is a waste or by-product, and further, that the conditioning treatments which I apply thereto are of a simple mechanical kind and can be performed at low expense with standard equipment. I have found that the dried bagasse lends itself to easy mechanical disintegration into fibers or fiber bundles of an average length of about one to four inches with little loss due to the formation of shorter fibers, even though the ultimate fibers of sugar cane are very much shorter, as attested by the short-fibered pulps secured when bagasse is cooked in chemical liquors to liberate the ultimate fibers for papermaking or other purposes.

So far as subject-matter is concerned, this application is a continuation in part of my application Serial No. 606,766, filed April 21, 1932.

I claim:—

1. A bedding material for poultry and animals consisting of a dry, loose, bulky, absorbent mass of fibers substantially free from pith and other dust and derived from bagasse.

2. A method of preparing fibrous bedding material for poultry and animals, which comprises drying bagasse at a temperature ranging from about 250° to 400° F. to sterilize it and render it easily disintegrable, mechanically disintegrating the dried bagasse into a bulky mass of fibers from which substantially all the pith has been liberated, and removing the liberated pith and other dust from the mass to produce a dry, loose, bulky, absorbent mass of fibrous bedding material.

3. A method of preparing fibrous bedding material for poultry and animals, which comprises drying bagasse to render it easily disintegrable, mechanically disintegrating under impact action the dried bagasse into a bulky mass of fibers containing substantially all the pith in the form of free dust and containing essentially only fibers whose average length is greater than about one inch, screening out fibers of a length greater than about four inches from the mass, and removing the pith and other dust from the screened mass to produce a loose, bulky, fibrous bedding having a fiber length ranging from about one to four inches.

4. A bedding material for poultry and animals consisting of a dry, loose, bulky, absorbent mass of fibers substantially free from pith and other dust and derived from bagasse, said fibers being of an average length not less than about one inch.

5. A bedding material for poultry and animals consisting of a dry, loose, bulky, absorbent mass of fibers substantially free from pith and other dust and derived from bagasse, said fibers being of an average length ranging from about one inch to about four inches and said mass of fibers being sterilized.

WILLIAM F. SMITH.